(12) United States Patent
Hisada et al.

(10) Patent No.: US 10,144,089 B2
(45) Date of Patent: Dec. 4, 2018

(54) LASER PROCESSING APPARATUS

(71) Applicant: TOYOTA JIDOSHA KABUSHIKI KAISHA, Toyota-shi, Aichi-ken (JP)

(72) Inventors: Kohei Hisada, Nagoya (JP); Atsushi Kawakita, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 368 days.

(21) Appl. No.: 15/109,718

(22) PCT Filed: Jan. 14, 2015

(86) PCT No.: PCT/IB2015/000019
§ 371 (c)(1),
(2) Date: Jul. 5, 2016

(87) PCT Pub. No.: WO2015/110887
PCT Pub. Date: Jul. 30, 2015

(65) Prior Publication Data
US 2016/0318125 A1 Nov. 3, 2016

(30) Foreign Application Priority Data
Jan. 22, 2014 (JP) ................................ 2014-009816

(51) Int. Cl.
*B23K 26/14* (2014.01)
*B23K 26/12* (2014.01)

(52) U.S. Cl.
CPC ........ *B23K 26/1476* (2013.01); *B23K 26/123* (2013.01)

(58) Field of Classification Search
CPC ................... B23K 26/1476; B23K 26/123
USPC ................... 219/121.63–121.72, 121.84
See application file for complete search history.

(56) References Cited

U.S. PATENT DOCUMENTS

| 4,780,592 A | 10/1988 | Rothe et al. |
| 4,794,222 A | 12/1988 | Funayama et al. |
| 2010/0252541 A1* | 10/2010 | Hogan ............ B23K 26/127 219/121.67 |

(Continued)

FOREIGN PATENT DOCUMENTS

| JP | H05-237682 A | 9/1993 |
| JP | H06-335790 A | 12/1994 |

(Continued)

*Primary Examiner* — Samuel M Heinrich
(74) *Attorney, Agent, or Firm* — Oliff PLC

(57) ABSTRACT

A laser processing apparatus includes: a head main body housing an optical system; and a nozzle that is fastened to the head main body by thread fastening and that applies the laser beam to a workpiece. The nozzle has a nozzle hole through which the laser beam passes. A pressure chamber is formed between the head main body and the nozzle. The pressure chamber is a space surrounded by a bottom surface of the head main body, the bottom surface intersecting with a fastening direction in which the head main body and the nozzle are fastened together by thread fastening, and a bottom surface of the nozzle, the bottom surface intersecting with the fastening direction. The pressure chamber is supplied with air or assist gas. The nozzle has a communication hole that provides communication between the pressure chamber and the nozzle hole.

5 Claims, 4 Drawing Sheets

(56) References Cited

U.S. PATENT DOCUMENTS

2010/0282725 A1\* 11/2010 Johnson ............ B23K 26/0648
219/121.67

FOREIGN PATENT DOCUMENTS

| JP | H09-166738 A | 6/1997 |
| JP | 2012-024831 A | 2/2012 |
| JP | 2012-192420 A | 10/2012 |
| WO | 2007/135460 A1 | 11/2007 |

\* cited by examiner

LASER PROCESSING APPARATUS

BACKGROUND OF THE INVENTION

1. Field of the Invention

The present invention relates to a laser processing apparatus that performs laser processing such as cutting or welding of a workpiece by applying a laser beam to the workpiece.

2. Description of Related Art

There are known laser processing apparatuses that perform laser processing such as cutting or welding of a workpiece by applying a laser beam to the workpiece. Some of the laser processing apparatuses are provided with a processing head including a head main body and a nozzle. The head main body houses an optical system including, for example, a condenser lens that a laser beam from an optical fiber enters and that condenses the laser beam. The nozzle applies the laser beam to the workpiece. Protection glass that protects the optical system from, for example, spatters generated during laser processing is disposed on the nozzle side of the optical system. Air or assist gas is supplied into the nozzle. By injecting the air or assist gas from the nozzle, spatters, fumes and the like generated by laser beam application are removed from a laser beam application portion. For example, Japanese Patent Application Publication No. 2012-24831 (JP 2012-24831 A) describes such a laser processing apparatus including protection glass that protects an optical system housed in a head main body of a processing head, and a nozzle into which air or assist gas is supplied.

In the laser processing apparatus described in JP 2012-24831 A, a processing head 27 is formed by coupling a blow nozzle 52 (nozzle) and a lens holder 51 (head main body) together by thread fastening, with a protection member 75 (protection glass) installed on the blow nozzle 52, and the protection glass is disposed between the lens holder 51 and the blow nozzle 52. The blow nozzle 52 has a supply passage 72 through which air flows. The air is supplied to a nozzle hole 73 of the blow nozzle 52 through the supply passage 72, and the supplied air is injected from the nozzle hole 73 toward a laser processing point.

In the processing head 27, a distal end portion of the lens holder 51 is housed in a housing space formed in the blow nozzle 52, and a clearance, which serves as an internal passage 71, is formed along the entire circumference between the inner peripheral surface of the blow nozzle 52, which defines the housing space, and the outer peripheral surface of the lens holder 51. The internal passage 71 communicates with the supply passage 72 and the nozzle hole 73. The air supplied to the supply passage 72 flows through the internal passage 71 and is then injected from the nozzle hole 73 toward a laser processing point. In this case, the air supplied to the supply passage 72 cleans the protection member 75 by flowing along the lower surface of the protection member 75 when flowing from the internal passage 71 into the nozzle hole 73.

In the processing head 27, however, sealing is not provided between the protection member 75 and the lens holder 51 and thus airtightness inside the lens holder 51 cannot be maintained. Thus, spatters, fumes and the like generated by laser application may enter the lens holder 51 from between the protection member 75 and the lens holder 51. This makes it difficult to keep the inside of the lens holder 51 clean. The blow nozzle 52 is fastened to the lens holder 51 by thread fastening. However, the thread-fastened portions may come loose due to, for example, vibrations during the operation of the processing head 27. This may further reduce the airtightness between the protection member 75 and the lens holder 51.

SUMMARY OF THE INVENTION

The present invention provides a laser processing apparatus configured to maintain the airtightness inside a head main body by reliably providing sealing between the head main body and protection glass in a processing head formed by coupling the head main body and a nozzle together by thread fastening.

An aspect of the invention relates to a laser processing apparatus including: a head main body housing an optical system that a laser beam enters and that condenses the laser beam; and a nozzle that is fastened to the head main body by thread fastening and that applies the laser beam to a workpiece. The nozzle has a nozzle hole through which the laser beam passes. The head main body has an opening that communicates with the nozzle hole. A protection member that closes the opening is disposed between the head main body and the nozzle. A pressure chamber is formed between the head main body and the nozzle. The pressure chamber is a space surrounded by a surface of the head main body, the surface of the head main body intersecting with a fastening direction in which the head main body and the nozzle are fastened together by thread fastening, and a surface of the nozzle, the surface of the nozzle intersecting with the fastening direction. The pressure chamber is supplied with air or assist gas. The nozzle has a communication hole that provides communication between the pressure chamber and the nozzle hole.

The pressure chamber may be a space surrounded by an annular groove and an end surface of the head main body, the end surface being on the nozzle side, the annular groove being formed in an outer peripheral portion of an end surface of the nozzle, the end surface being on the head main body side, and the annular groove being located radially outward of the nozzle hole. The communication hole may extend from a bottom surface of the groove to an inner peripheral surface of the nozzle, the inner peripheral surface defining the nozzle hole.

The head main body may have a supply passage through which air or assist gas is supplied to the pressure chamber.

The head main body may have the supply passage. The supply passage may be a supply hole that opens on an end surface of the head main body, the end surface being in the pressure chamber and the end surface being an end surface that faces the nozzle. An opening of the supply hole may be offset in position from an opening of the communication hole when viewed from the fastening direction.

The nozzle may have a plurality of the communication holes; the communication holes may be offset in phase from each other to be arranged at regular intervals in a circumferential direction of the bottom surface of the groove; the supply passage may be a supply hole that opens on an end surface of the head main body, the end surface being in the pressure chamber and the end surface being an end surface that faces the nozzle; an opening of the supply hole may be offset in position from openings of the communication holes in the circumferential direction of the bottom surface of the groove when viewed from the fastening direction.

According to the present invention, it is possible to maintain the airtightness inside the head main body of the processing head.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Next, embodiments of the present invention will be described with reference to the accompanying drawings.

Figure 1:
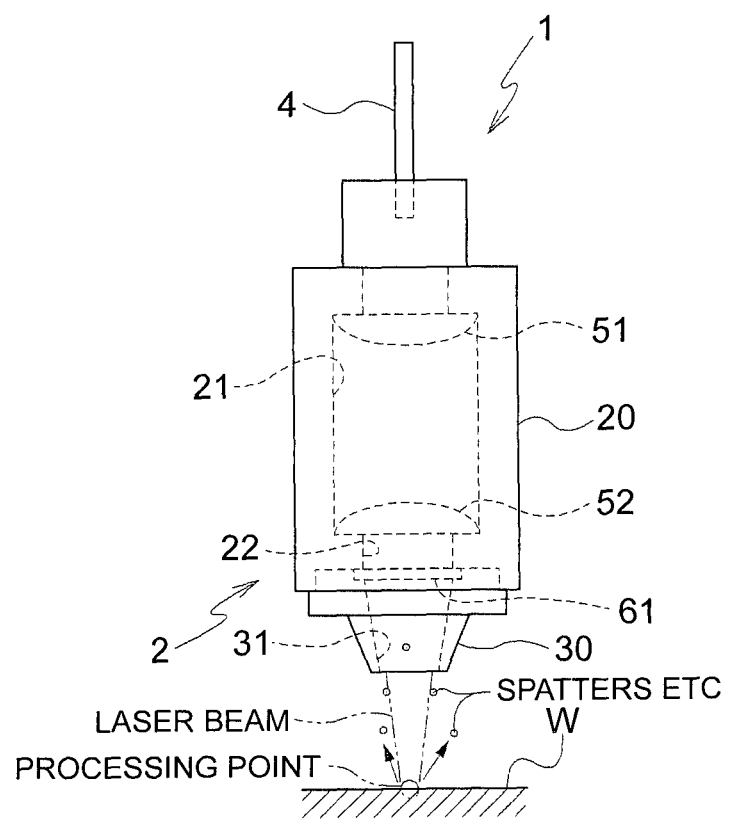
FIG. 1 is a side view showing a laser applicator.

A laser applicator 1 shown in FIG. 1 is used to perform laser processing such as cutting or welding of a workpiece W by applying a laser beam to the workpiece W. The laser applicator 1 includes an optical fiber 4 and a processing head 2. The optical fiber 4 transmits a laser beam generated by a laser oscillator (not shown). The laser beam transmitted through the optical fiber 4 enters the processing head 2, and then the processing head 2 applies the laser beam to the workpiece W.

The processing head 2 includes a head main body 20 and a nozzle 30. The head main body 20 houses an optical system including an entry-side lens 51 that collimates the laser beam from the optical fiber 4, and an exit-side lens 52 that condenses the collimated beam. The nozzle 30 applies the laser beam condensed by the exit-side lens 52 to the workpiece W.

The head main body 20 has, for example, a cylindrical shape. The optical fiber 4 is connected to one axial end portion of the head main body 20 and the nozzle 30 is connected to the other axial end portion of the head main body 20. The head main body 20 has a housing space 21 and an opening 22. The housing space 21 houses the optical system including the entry-side lens 51 and the exit-side lens 52. Through the opening 22, the housing space 21 opens on the nozzle 30-side of the head main body 20.

The nozzle 30 has, for example, a cylindrical shape. The nozzle 30 has a tapered distal end portion that decreases in diameter toward its distal end. The nozzle 30 has a nozzle hole 31 that extends through the nozzle 30 in its axial direction. The nozzle 30 is fastened to the head main body 20 by thread fastening. Protection glass 61 is interposed between the head main body 20 and the nozzle 30. The protection glass 61 is made of, for example, a glass member that allows a laser beam to pass therethrough.

In the laser applicator 1 configured as described above, when a laser beam from the optical fiber 4 enters the housing space 21 of the head main body 20, the laser beam is collimated by the entry-side lens 51 and the collimated beam is condensed by the exit-side lens 52. Then, the condensed beam passes through the protection glass 61, and is applied to the workpiece W through the nozzle hole 31 of the nozzle 30.

Figure 2:
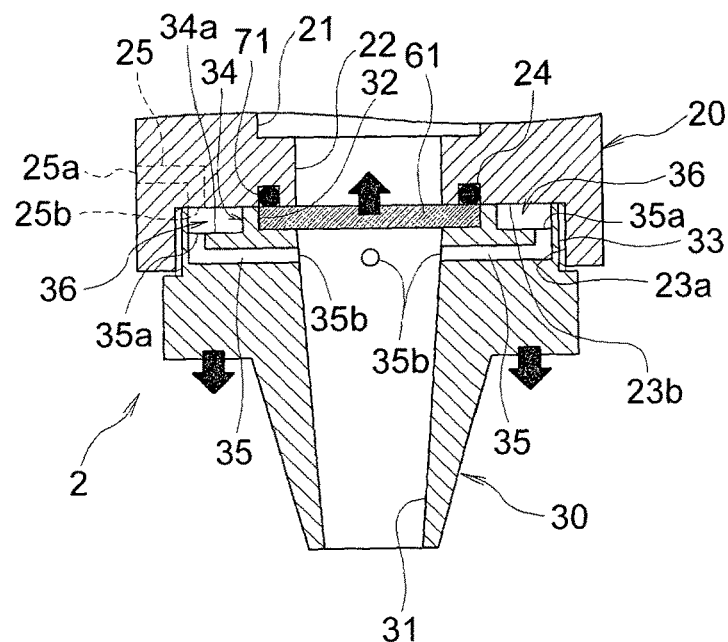
FIG. 2 is a sectional side view showing a nozzle-side portion of a processing head.
Figure 3:
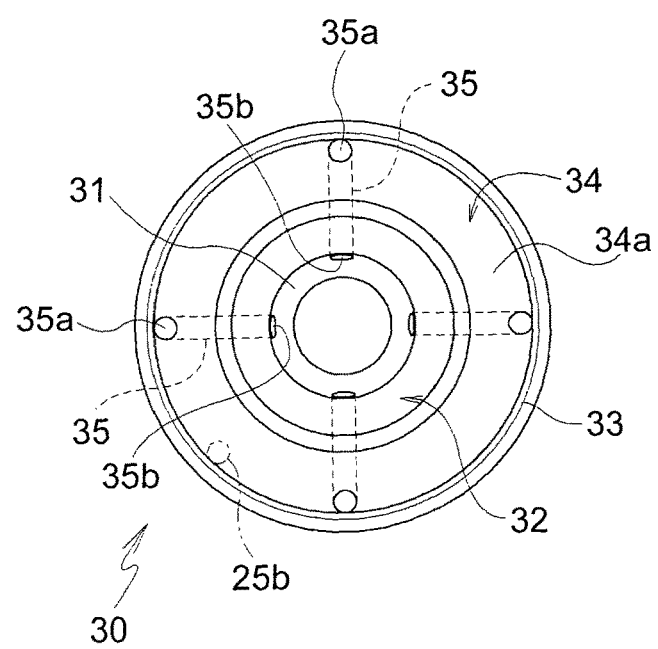
FIG. 3 is a plan view showing a nozzle.
Figure 4:
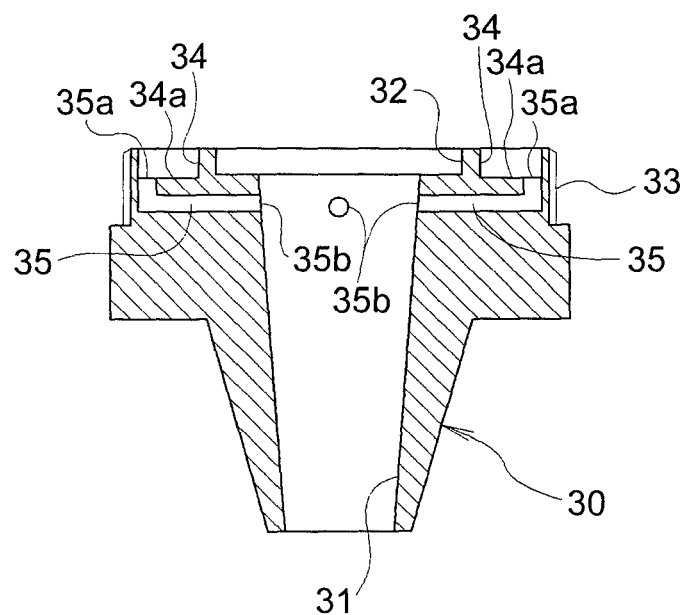
FIG. 4 is a sectional side view showing the nozzle.

Next, the nozzle 30 and the head main body 20 will be described in detail. As shown in FIG. 2 to FIG. 4, a fitting groove 32 having a circular shape with a diameter larger than that of the nozzle hole 31 is formed at the center of the end surface of the nozzle 30, which is on the head main body 20 side (hereinafter, referred to as "head main body-side end surface of the nozzle 30"). The diameter of the fitting groove 32 is equal to or slightly larger than the outside diameter of the protection glass 61 having a disc shape. Thus, the protection glass 61 can be fitted in the fitting groove 32. The depth of the fitting groove 32 is equal to or slightly larger than the thickness of the protection glass 61.

An annular groove 34 is formed in the head main body-side end surface of the nozzle 30, at a position radially outward of the fitting groove 32. In a planar view, the groove 34 is located radially outward of the nozzle hole 31. The nozzle 30 has communication holes 35 that provide communication between the groove 34 and the nozzle hole 31. One end of each communication hole 35 is a circular opening 35a that opens on a bottom surface 34a of the groove 34, and the other end of each communication hole 35 is a circular opening 35b that opens on the inner peripheral surface of nozzle 30, which defines the nozzle hole 31. The openings 35a are located at an outer peripheral side end portion of the bottom surface 34a of the groove 34. The openings 35b are located at an upper end portion of the inner peripheral surface of the nozzle 30, which defines the nozzle hole 31.

In this embodiment, the communication holes 35 are formed at four positions, and the communication holes 35 are offset in phase from each other to be arranged at regular intervals in the circumferential direction of the bottom surface 34a. The diameter of the opening 35a of each communication hole 35 is smaller than the width of the bottom surface 34a of the groove 34 (the dimension of the bottom surface 34a in the radial direction of the nozzle 30), and the total area of the openings 35a of all the communication holes 35 is considerably smaller than the area of the bottom surface 34a of the groove 34.

An external thread 33 is formed on the outer peripheral surface of the end portion of the nozzle 30, which is on the head main body 20 side (hereinafter, referred to as "head main body-side end portion of the nozzle 30"). As the external thread 33 is fastened to the head main body 20, the nozzle 30 is coupled to the head main body 20.

Figure 5:
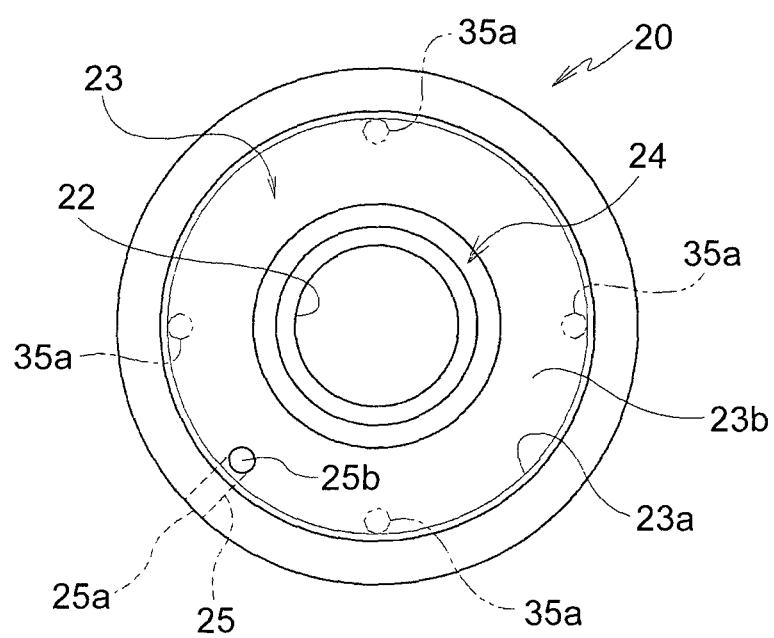
FIG. 5 is a bottom view showing a head main body.
Figure 6:
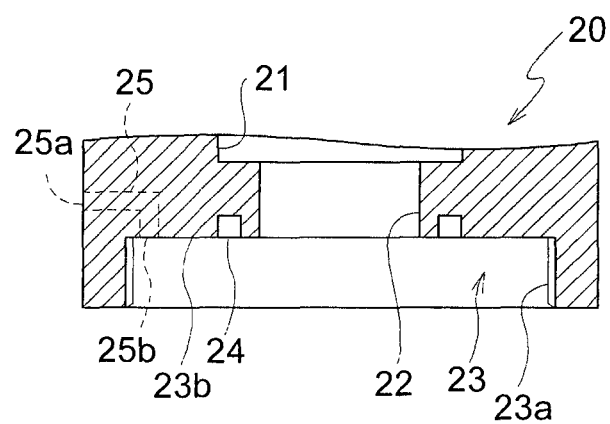
FIG. 6 is a sectional side view showing the head main body.

As shown in FIG. 2, FIG. 5, and FIG. 6, a fitting groove 23 having a circular shape with a diameter larger than that of the opening 22 is formed at the center of the end surface of the head main body 20, which is on the nozzle 30 side (hereinafter, referred to as "nozzle-side end surface of the head main body 20"). The diameter of the fitting groove 23 is substantially equal to the outside diameter of the head main body-side end portion of the nozzle 30, which is provided with the external thread 33. An internal thread 23a is formed on the inner peripheral surface of the head main body 20, which defines the fitting groove 23. The internal thread 23a of the head main body 20 and the external thread 33 of the nozzle 30 are configured to be screwed together. As the internal thread 23a and the external thread 33 are screwed together, the head main body-side end portion of the nozzle 30 is fitted in the fitting groove 23 of the head main body 20, so that the head main body 20 and the nozzle 30 are fastened together by thread fastening. In this case, the fastening direction in which the internal thread 23a and the external thread 33 fastened together by thread fastening coincides with the axial direction of the head main body 20 and the nozzle 30. That is, the fastening direction in which the head main body 20 and the nozzle 30 are fastened together coincides with the axial direction of the head main body 20 and the nozzle 30.

An annular seal groove 24 is formed in a bottom surface 23b of the fitting groove 23, at a position near the outer periphery of the opening 22. A seal member 71, such as an O-ring, can be fitted in the seal groove 24. The head main body 20 has a supply hole 25 that connects the fitting groove 23 to the outer periphery of the head main body 20. One end of the supply hole 25 is a circular opening 25a that opens on the outer peripheral surface of the head main body 20, and the other end of the supply hole 25 is a circular opening 25b that opens on the bottom surface 23b of the fitting groove 23.

The opening 25b is located at an outer peripheral side end portion of the bottom surface 23b of the fitting groove 23. When the head main body 20 and the nozzle 30 are fastened together, the opening 25h is located at a position corresponding to the portion where the groove 34 of the nozzle 30 is formed. When the head main body 20 and the nozzle 30 are fastened together, the opening 25b is located at a position that is offset in phase from the communication holes 35 of the nozzle 30 in a planar view (when viewed from the fastening direction in which the head main body 20 and the nozzle 30 are fastened together).

When the head main body 20 and the nozzle 30 are fastened together, a space surrounded by the groove 34 of the nozzle 30 (more specifically, the bottom surface 34a, the inner peripheral-side surface, and the outer peripheral-side surface of the groove 34 of the nozzle 30) and the bottom surface 23b of the fitting groove 23 of the head main body 20 is formed between the head main body 20 and the nozzle 30. This space serves as a pressure chamber 36. The opening 25a of the supply hole 25 of the head main body 20 opens on a portion of the bottom surface 23b of the fitting groove 23, which forms the pressure chamber 36. The bottom surface 23b of the fitting groove 23 and the bottom surface 34a of the groove 34 in the pressure chamber 36 are surfaces that intersect with the fastening direction in which the head main body 20 and the nozzle 30 are fastened together, more specifically, surfaces that are perpendicular to the fastening direction.

When the nozzle 30 and the head main body 20 configured as described above are fastened together by screwing the internal thread 23a and the external thread 33 together, the internal thread 23a and the external thread 33 are screwed together with the protection glass 61 fitted in the fitting groove 32 of the nozzle 30.

The opening 22 of the head main body 20 and the nozzle hole 31 of the nozzle 30 are formed at such positions that the opening 22 and the nozzle hole 31 communicate with each other when the head main body 20 and the nozzle 30 are fastened together. However, the opening 22 and the nozzle hole 31 are separated from each other by the protection glass 61 interposed between the head main body 20 and the nozzle 30. That is, the opening 22 of the head main body 20 is closed by the protection glass 61. Further, when the head main body 20 and the nozzle 30 are fastened together, the seal member 71 fitted in the seal groove 24 is pressed against the peripheral edge of the protection glass 61, thereby providing sealing between the opening 22 of the head main body 20 and the protection glass 61.

As described above, the opening 22 of the head main body 20 is closed by the protection glass 61 and the seal member 71 provides sealing between the opening 22 and the protection glass 61. With this configuration, it is possible to prevent spatters, fumes and the like, which are generated during application of a laser beam from the nozzle 30 to the workpiece W, from entering the head main body 20 from the nozzle hole 31 through the opening 22. Thus, the optical system in the head main body 20 can be kept clean.

The nozzle 30-side surface of the protection glass 61 interposed between the head main body 20 and the nozzle 30 becomes dirty due to adhesion of spatters, fumes and the like generated during application of the laser beam to the workpiece W. Therefore, it is necessary to periodically replace the protection glass 61. In the laser applicator 1, the protection glass 61 is interposed between the head main body 20 and the nozzle 30, and the head main body 20 and the nozzle 30 are fastened together by screwing the internal thread 23a and the external thread 33 together. Therefore, when the protection glass 61 is replaced, the protection glass 61 can be taken out of the fitting groove 32 of the nozzle 30 just by unscrewing the head main body 20 and the nozzle 30 from each other to remove the nozzle 30 from the head main body 20. Thus, it is possible to facilitate a work of replacing the protection glass 61.

During the operation of the laser applicator 1 that applies a laser beam from the nozzle 30 to the workpiece W, air or assist gas formed of inert gas is supplied under pressure to the opening 25a of the supply hole 25. The air or assist gas supplied under pressure to the opening 25a is then supplied to the pressure chamber 36 through the supply hole 25. The air or assist gas supplied to the pressure chamber 36 is then supplied through the communication holes 35 to the nozzle hole 31, and finally flows out of the distal end portion of the nozzle hole 31 toward the workpiece W. In this way, the air or assist gas flowing out of the distal end portion of the nozzle hole 31 removes spatters, fumes and the like generated during application of the laser beam to the workpiece W.

The nozzle hole 31, into which the air or assist gas is supplied through the communication holes 35, is filled with the air or the assist gas, and the pressure inside the nozzle hole 31 becomes a positive pressure. The air or assist gas that fills the nozzle hole 31 presses the protection glass 61 toward the head main body 20 side, so that sealing is further reliably provided between the protection glass 61 and the opening 22. Thus, the airtightness inside the head main body 20 improves, so that the optical system is more reliably kept clean.

The pressure chamber 36, into which the air or assist gas is supplied through the supply hole 25, is filled with the air or assist gas, so that the pressure inside the pressure chamber becomes a positive pressure. In other words, the air or assist gas in an amount large enough to develop a positive pressure inside the pressure chamber 36 is supplied to the pressure chamber 36 through the supply hole 25. The air or assist gas that fills the pressure chamber 36 presses the bottom surface 23b of the fitting groove 23 of the head main body 20 and the bottom surface 34a of the groove 34 of the nozzle 30 in such directions that the bottom surface 23b and the bottom surface 34a move away from each other. That is, forces in the fastening direction in which the head main body 20 and the nozzle 30 are fastened together are applied to the bottom surface 23b and the bottom surface 34a by the air or assist gas in the pressure chamber 36. Thus, axial forces in the fastening direction are applied to the internal thread 23a and the external thread 33 screwed together. As a result, the internal thread 23a and the external thread 33 are fastened together further tightly. Therefore, for example, even when vibrations are transmitted to the processing head 2 during the operation of the laser applicator 1, the internal thread 23a and the external thread 33 do not come loose and the sealing performance between the protection glass 61 and the opening 22 is not reduce. This makes it possible to maintain the airtightness in the head main body 20.

Even if the internal thread 23a and the external thread 33 are loosely screwed together (i.e., are not screwed together sufficiently tightly) when the head main body 20 and the nozzle 30 are fastened together, it is possible to apply axial forces to the internal thread 23a and external thread 33 using the air or assist gas in the pressure chamber 36, thereby further tightly fastening the internal thread 23a and the external thread 33 together. Thus, there is no need to screw the internal thread 23a and the external thread 33 together tightly more than necessary. Thus, it is possible to avoid damages to the internal thread 23a and the external thread 33, which would be caused when the internal thread 23a and the external thread 33 are screwed together excessively tightly.

In particular, the total area of the openings 35a of the communication holes 35 that provide communication between the pressure chamber 36 and the nozzle hole 31 is considerably smaller than the area of the bottom surface 34a of the groove 34, on which the openings 35a open. Thus, the flow volume of the air or assist gas flowing out of the pressure chamber 36 into the nozzle hole 31 is considerably smaller than the volume of the air or assist gas that is present in the pressure chamber 36, so that the pressure chamber 36 is kept high. Therefore, it is possible to apply large axial forces in the fastening direction, to the internal thread 23a and the external thread 33 that are screwed together. As a result, it is possible to more reliably keep the head main body 20 and the nozzle 30 fastened tightly together.

The opening 25b of the supply hole 25 and the openings 35a of the communication holes 35 are located at positions that are offset in phase from each other when viewed from the fastening direction. This configuration does not allow the air or assist gas, which is supplied from the opening 25b of the supply hole 25 into the pressure chamber 36, to directly flow out from the openings 35a of the communication holes 35 into the nozzle hole 31 without flowing in the pressure chamber 36. Thus, the air or assist gas supplied from the opening 25b of the supply hole 25 is likely to accumulate in the pressure chamber 36, so that the pressure in the pressure chamber 36 can be kept high.

For example, if a supply passage for supplying air or assist gas to the processing head 2 is formed in the nozzle 30, a pipe, which connects a supply source of the air or assist gas to the supply passage, is connected to the nozzle 30. If the pipe for supplying air or assist gas is connected to the nozzle 30, the pipe obstructs a work of removing the nozzle 30 from the head main body 20. This makes it cumbersome to remove the nozzle 30 from the head main body 20. In this embodiment, however, the supply hole 25 formed in the head main body 20 is used as the supply passage through which the air or assist gas is supplied to the processing head 2, and therefore the pipe is connected to the head main body 20. Thus, the pipe does not obstruct a work of removing the nozzle 30 from the head main body 20. As a result, removal of the nozzle 30 from the head main body 20 is facilitated.

The depth of the fitting groove 32 in which the protection glass 61 is fitted is preferably larger than the thickness of the protection glass 61. If the fitting groove 32 has a depth larger than the thickness of the protection glass 61, the protection glass 61 does not come into contact with the bottom surface 23b of the fitting groove 23 when the head main body 20 and the nozzle 30 are fastened together by screwing the internal thread 23a and the external thread 33 together. As a result, it is possible to cause damages to the protection glass 61.

What is claimed is:

1. A laser processing apparatus comprising:
  a head main body housing an optical system that a laser beam enters and that condenses the laser beam; and
  a nozzle that is fastened to the head main body by thread fastening and that applies the laser beam to a workpiece, wherein
  the nozzle has a nozzle hole through which the laser beam passes,
  the head main body has an opening that communicates with the nozzle hole,
  a protection member that closes the opening is disposed between the head main body and the nozzle,
  a pressure chamber is formed between the head main body and the nozzle, the pressure chamber being a space surrounded by a surface of the head main body, the surface of the head main body intersecting with a fastening direction in which the head main body and the nozzle are fastened together by thread fastening, and a surface of the nozzle, the surface of the nozzle intersecting with the fastening direction, and the pressure chamber being supplied with air or assist gas, and
  the nozzle has a communication hole that provides communication between the pressure chamber and the nozzle hole.

2. The laser processing apparatus according to claim 1, wherein:
  the pressure chamber is a space surrounded by an annular groove and an end surface of the head main body, the end surface being on the nozzle side, the annular groove being formed in an outer peripheral portion of an end surface of the nozzle, the end surface being on the head main body side, and the annular groove being located radially outward of the nozzle hole; and
  the communication hole extends from a bottom surface of the groove to an inner peripheral surface of the nozzle, the inner peripheral surface defining the nozzle hole.

3. The laser processing apparatus according to claim 1, wherein the head main body has a supply passage through which air or assist gas is supplied to the pressure chamber.

4. The laser processing apparatus according to claim 3, wherein:
  the head main body has the supply passage;
  the supply passage is a supply hole that opens on an end surface of the head main body, the end surface being in the pressure chamber and the end surface being an end surface that faces the nozzle; and
  an opening of the supply hole is offset in position from an opening of the communication hole when viewed from the fastening direction.

5. The laser processing apparatus according to claim 3, wherein:
  the nozzle has a plurality of the communication holes;
  the communication holes are offset in phase from each other to be arranged at regular intervals in a circumferential direction of the bottom surface of the groove;
  the supply passage is a supply hole that opens on an end surface of the head main body, the end surface being in the pressure chamber and the end surface being an end surface that faces the nozzle;
  an opening of the supply hole is offset in phase from openings of the communication holes in the circumferential direction of the bottom surface of the groove when viewed from the fastening direction.

* * * * *